us011060393B1

(12) United States Patent
Gopalan

(10) Patent No.: US 11,060,393 B1
(45) Date of Patent: Jul. 13, 2021

(54) SHOCK ISOLATED GAMMA PROBE

(71) Applicant: RIME Downhole Technologies, LLC, Benbrook, TX (US)

(72) Inventor: Manoj Gopalan, Fort Worth, TX (US)

(73) Assignee: Rime Downhole Technologies, LLC, Benbrook, TX (US)

( * ) Notice: Subject to any disclaimer, the term of this patent is extended or adjusted under 35 U.S.C. 154(b) by 0 days.

(21) Appl. No.: 16/945,308

(22) Filed: Jul. 31, 2020

(51) Int. Cl.
*E21B 47/017* (2012.01)
*G01T 1/202* (2006.01)
*E21B 17/07* (2006.01)
*G01T 1/20* (2006.01)

(52) U.S. Cl.
CPC .......... *E21B 47/017* (2020.05); *G01T 1/2026* (2013.01); *G01T 1/20189* (2020.05)

(58) Field of Classification Search
CPC ........ E21B 47/01; E21B 47/017; E21B 17/07; E21B 47/013; E21B 47/0175; G01T 1/2026
See application file for complete search history.

(56) References Cited

U.S. PATENT DOCUMENTS

| | | | |
|---|---|---|---|
| 3,323,326 A * | 6/1967 | Vertson | E21B 17/07 464/20 |
| 7,115,873 B2 | 10/2006 | Medley et al. | |
| 7,381,957 B2 | 6/2008 | Medley et al. | |
| 7,485,851 B2 | 2/2009 | Medley et al. | |
| 7,485,865 B2 | 2/2009 | Medley et al. | |
| 7,735,579 B2 * | 6/2010 | Gopalan | E21B 47/24 175/40 |
| 10,344,590 B1 * | 7/2019 | Young | E21B 47/022 |
| 10,620,272 B2 * | 4/2020 | Pare | H01M 10/0525 |

OTHER PUBLICATIONS

Deteq Services, 177C MWD Gamma Modules, 3 pp., United States of America.
Hunting, MWD Directional Detector Module (MWD-DGDM), Oct. 21, 2019, 4 pp., United States of America.

* cited by examiner

*Primary Examiner* — Catherine Loikith
(74) *Attorney, Agent, or Firm* — Timothy G. Ackermann

(57) ABSTRACT

A shock isolated gamma probe attenuates axial, lateral, and torsional shocks to a gamma sensor package. A gamma sensor is inserted into and fixed to a tubular cartridge. The cartridge is closed with a cap and keyed at the other end. The cartridge is inserted into a resilient sleeve having an extension at the closed end to conform to the key on the cartridge. The open end of the resilient sleeve is closed with a gasket. The sleeve/cartridge assembly are inserted into a tubular structure on a first chassis. The first chassis has a keying structure for the key and extension of the resilient on an end bulkhead. The cartridge and first chassis are resiliently engaged to attenuate shocks. A second bulkhead, on a second chassis, closes the open end of the tubular structure on the first chassis.

29 Claims, 9 Drawing Sheets

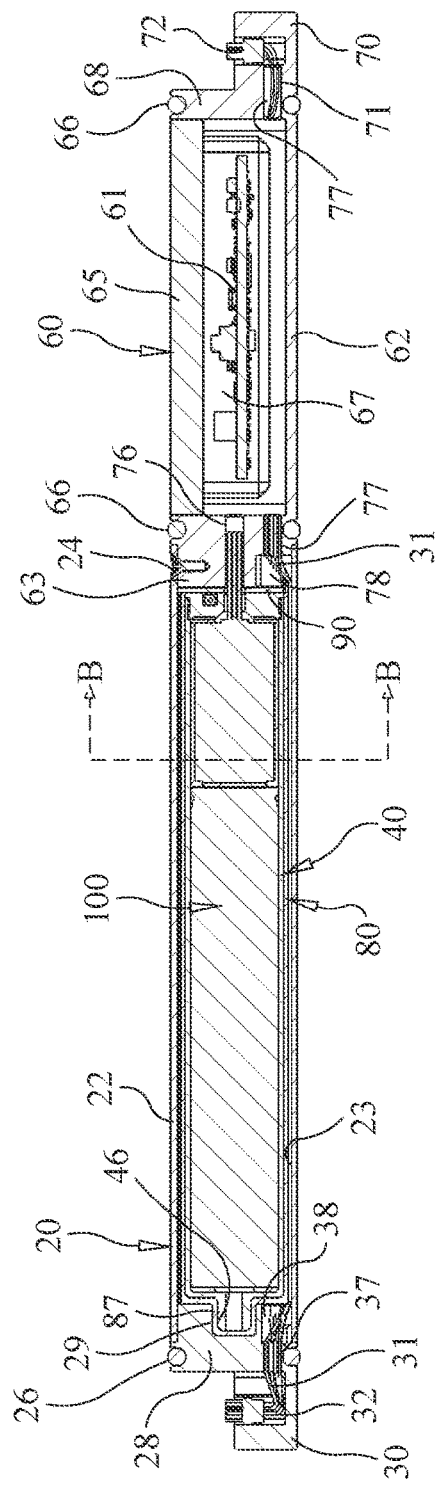
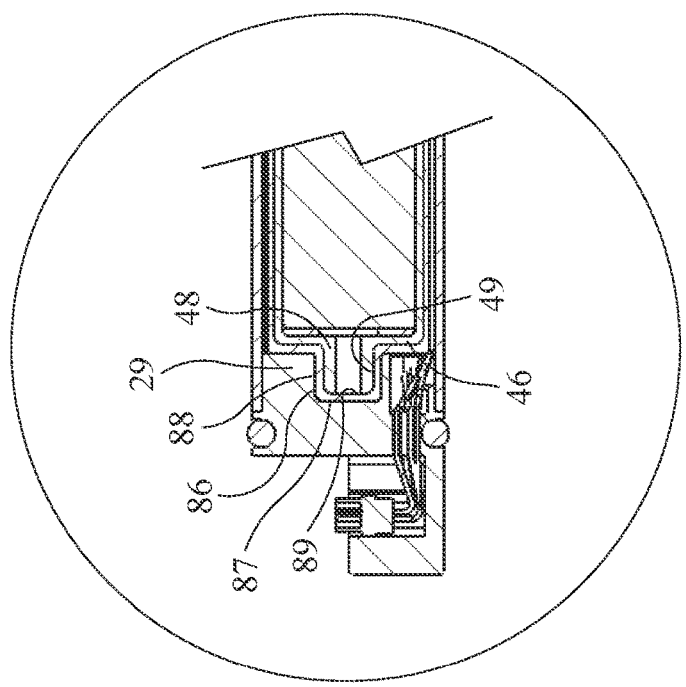
FIG. 2B
FIG. 2C

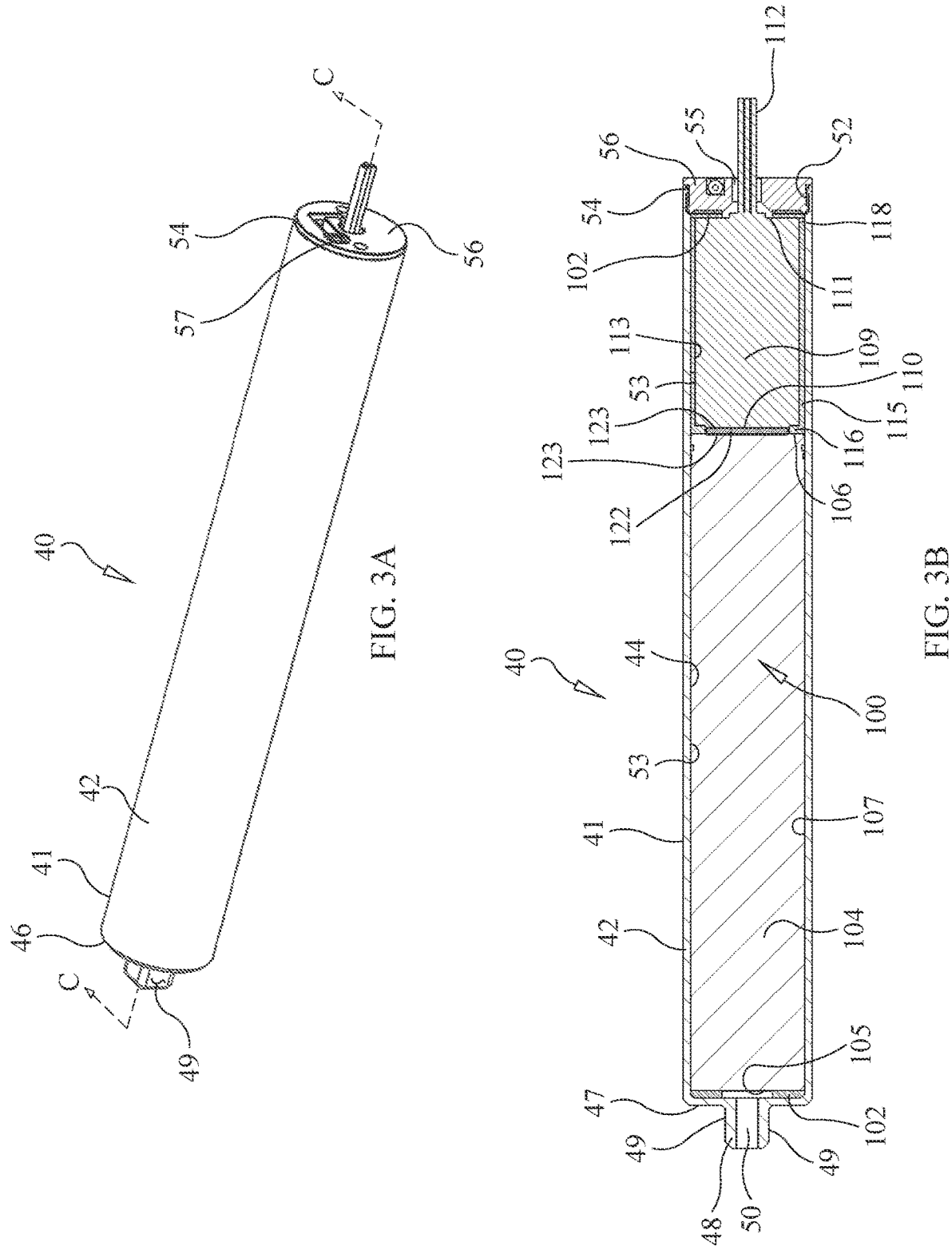

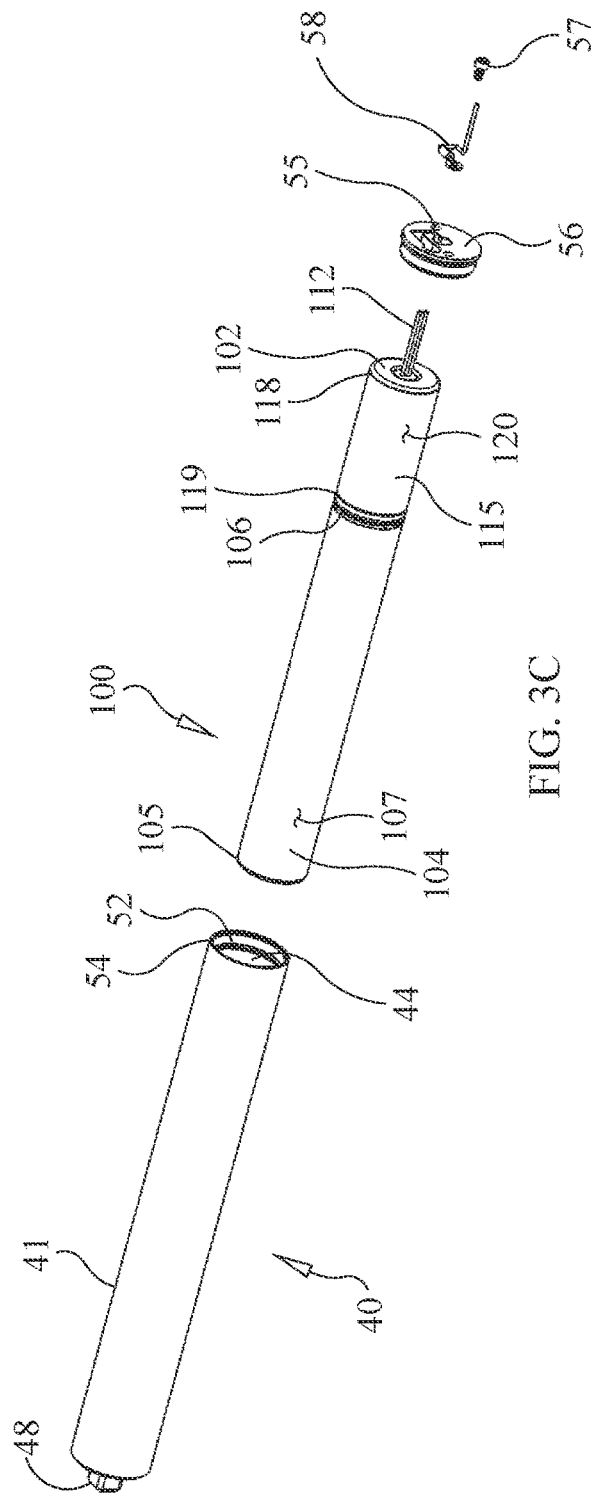
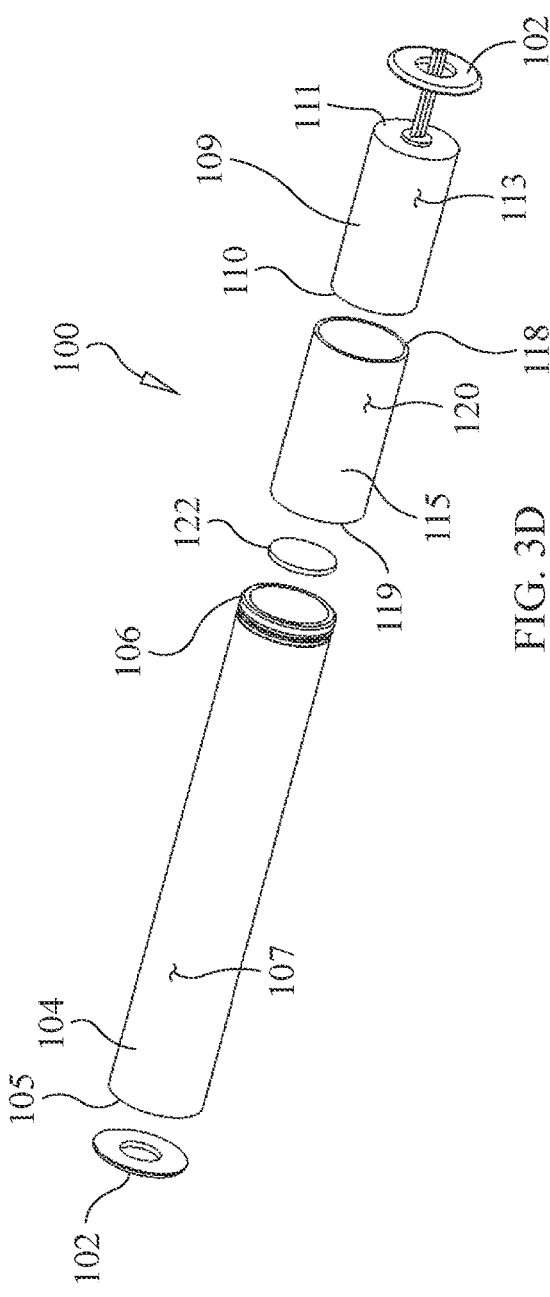
FIG. 3C
FIG. 3D

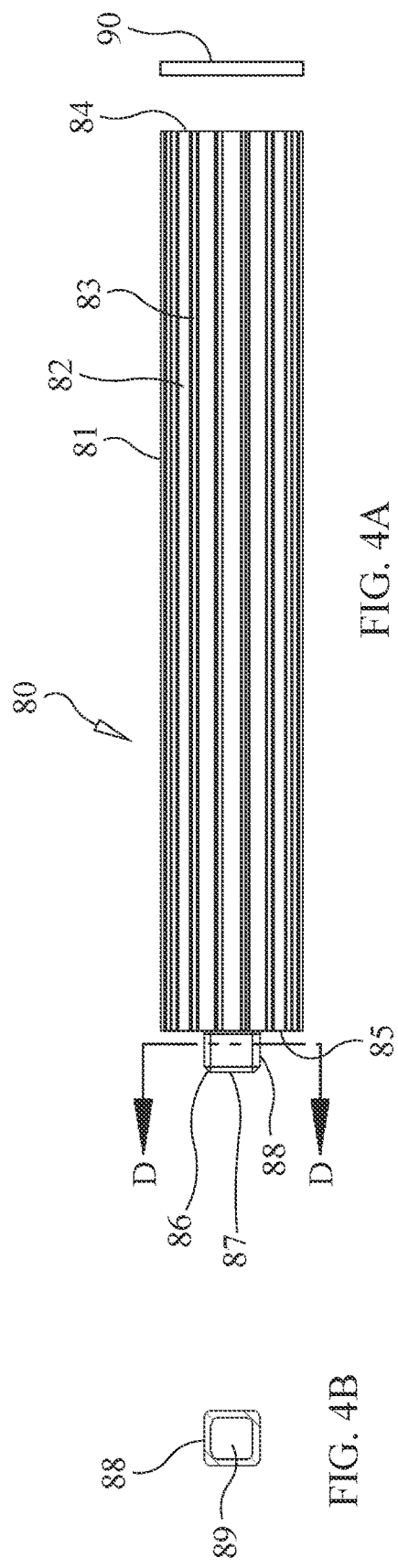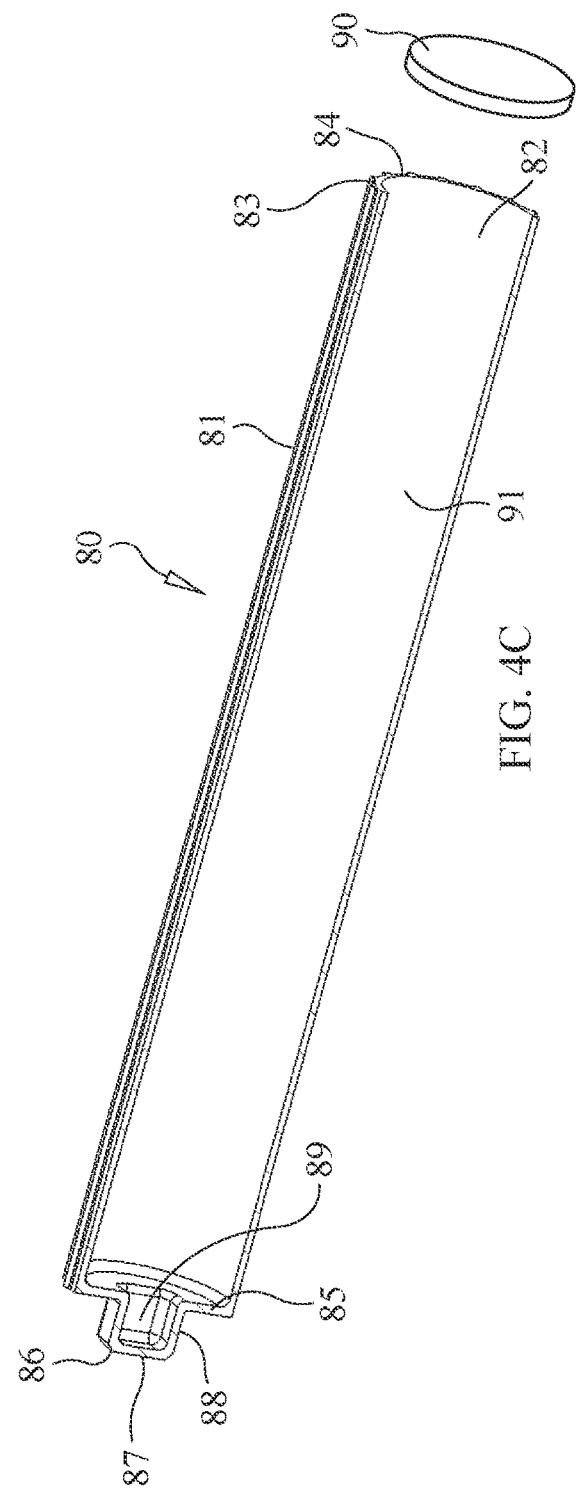

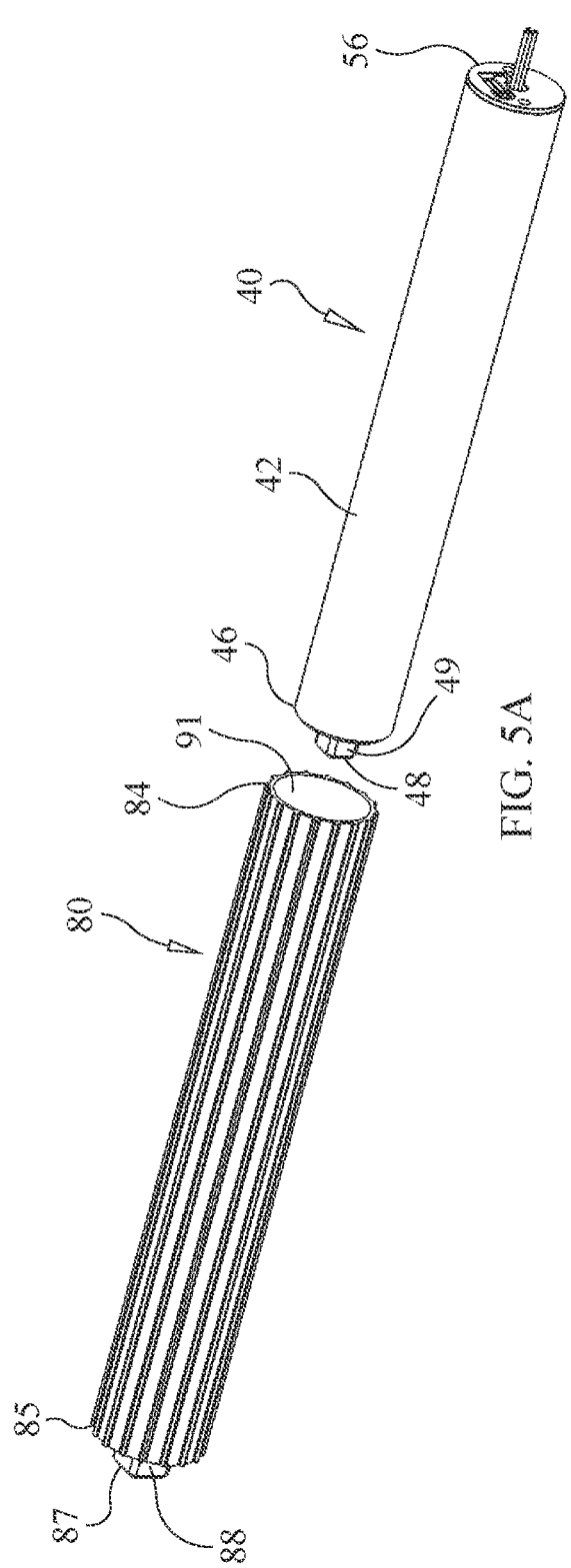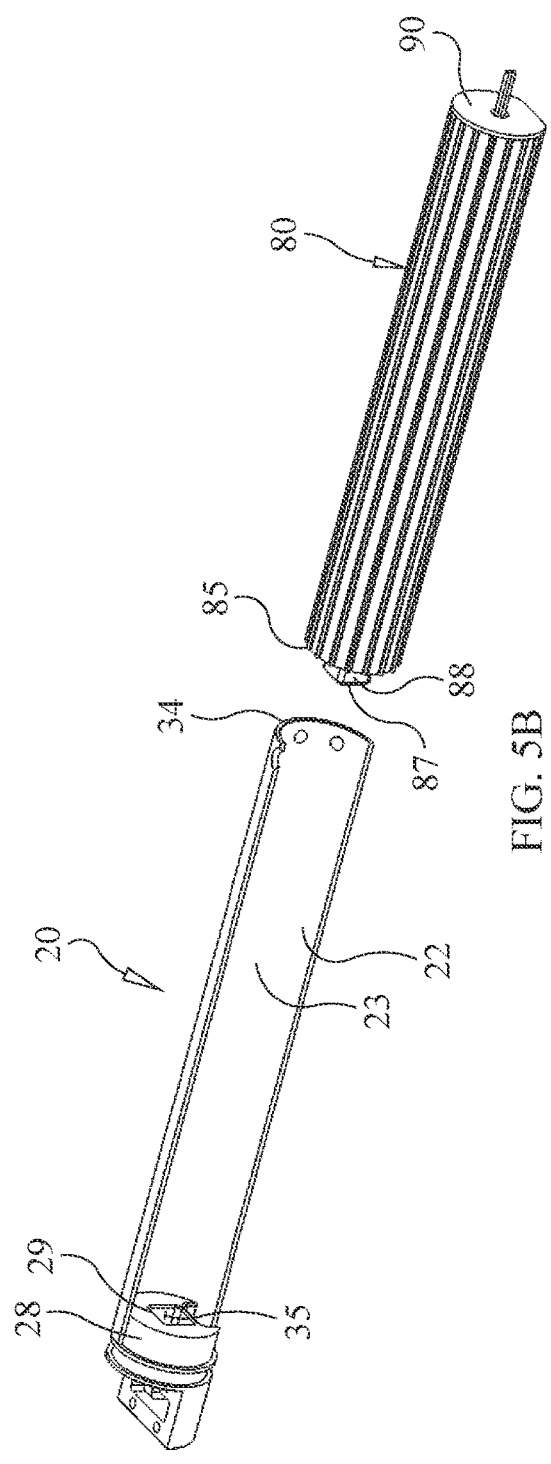
FIG. 5A
FIG. 5B

SHOCK ISOLATED GAMMA PROBE

BACKGROUND OF THE INVENTION

The invention relates generally to down-hole sensors and equipment and to a shock isolation system to dampen vibrations that can damage down-hole sensors such as a gamma probe.

In the drilling of deep bore holes, the rotary drilling technique has become a commonly accepted practice. This technique involves using a drill string which consists of numerous sections of hollow pipe connected together and to the bottom end of which a drill bit is attached. By imparting axial forces onto the drilling bit and by rotating the drill string either from the surface or using a hydraulic motor attached to the drill string, a reasonably smooth and circular bore hole is created. The rotation and compression of the drilling bit causes the formation being drilled to be crushed and pulverized. Drilling fluid is pumped down the hollow center of the drill string through nozzles on the drilling bit and then back to the surface around the annulus of the drill string. This fluid circulation is used to transport the cuttings from the bottom of the bore hole to the surface where they are filtered out and the drilling fluid is recirculated as desired. The flow of the drilling fluid also provides other secondary functions such as cooling and lubricating the drilling bit cutting surfaces and exerts a hydrostatic pressure against the borehole walls to help contain any entrapped gases or fluids that are encountered during the drilling process. To enable the drilling fluid to travel through the hollow center of the drill string, the restrictive nozzles in the drilling bit and to have sufficient momentum to carry cutting and debris back to the surface, the fluid circulation system at the surface includes a pump or multiple pumps capable of sustaining sufficiently high pressures and flow rates, piping, valves and swivel joints to connect the piping to the rotating drill string.

The need to measure certain parameters at the bottom of a bore hole and provide this information to the driller has long been recognized. These parameters include, but are not limited to the temperature, pressure, inclination and direction of the bore hole, vibration levels, inclination, azimuth, toolface (rotational orientation of the drill string), but also include various geophysical and lithological measurements and formation geophysical properties such as resistivity, porosity, permeability, and density as well as in situ formation analysis for hydrocarbon content. The challenge of measuring these parameters in the hostile environment at the bottom of a borehole during the drilling process and conveying this information to the surface in a timely fashion has led to the development of many devices and practices.

It is an advantage to be able send data from the bottom of a bore well to the surface, while drilling, and without the use of wires or cables, and without the continuous and/or frequent interruption of drilling activity. Thus, tools commonly referred to as "measurement while drilling" or "MWD" tools have been developed. Several types of MWD tools have been contemplated in the prior art and are discussed in brief below.

MWD tools may transmit data in several ways, including: creating EM (low frequency radio waves or signals, currents in the earth or magnetic fields) waves to propagate signals through the earth; imparting high frequency vibrations to the drill string which can be used to encode and transmit data to the surface; and creating pressure pulses to encode and transmit data to the surface of the earth from the bottom of a borehole.

Sensors are a component of an MWD/LWD platform, which may include a gamma probe, also referred to as a gamma ray tool. A gamma probe is used to measure naturally-occurring gamma radiation to characterize the rock or sediment around a borehole or drill hole so as to record gamma radiation variation with depth and position and create a gamma log therefrom. A gamma sensor system may include a scintillator crystal, an optical coupling structure, a photo-multiplier tube (PMT), electronic controls, and communications hardware and software. A scintillator is a material that exhibits scintillation when excited by ionizing radiation, by absorbing the energy of the incoming particle and re-emitting the absorbed energy in the form of light. A scintillator in crystalline form is typically a single large crystal and are both expensive and mechanically fragile. The scintillator thus reacts to the gamma rays by emitting light, and the gamma probe uses that light to measure the radiation. The scintillator is optically coupled, by an optical coupling pad, to an electronic light sensor such as a PMT. Other such sensors include a photodiode or silicon photo-multiplier. PMTs absorb the light emitted by the scintillator and re-emit it in the form of electrons via the photoelectric effect. The subsequent multiplication of those electrons (sometimes called photo-electrons) results in an electrical pulse which can then be analyzed. Electronic controls and communications hardware and software are then used to create and send a signal with that information.

An MWD or LWD platform typically must be locked rotationally (about the longitudinal axis of the drill string) to maintain it in a known/fixed rotational orientation to elements of the drill string (such as the drill bit). This permits the platform to accurately measure/record data such as inclination and direction of the bore hole, inclination, azimuth, and toolface (rotational orientation of the drill string).

A problem encountered in MWD and LWD systems is that the drilling process involves creating axial vibrations and shocks that can cause equipment damage and interfere with signal transmission of signals generated by the sensors. Another problem encountered in MWD and LWD systems is that the drilling process involves rotation, slow, steady, fast, and jerky, of the drill string, and the MWD and LWD systems must maintain the known/fixed rotation despite these. MWD and LWD systems are typically mechanically fixed to and supported by a part of the drill string that experiences these mechanical vibrations and shocks.

SUMMARY OF THE INVENTION

A new and improved apparatus and method of assembly are presented that allow a shock isolated gamma probe, as incorporated into a drilling system, to attenuate shocks to its internal components that the shock isolated gamma probe experiences along the longitudinal and lateral axes of the drilling system and shocks forces about the longitudinal axis of the drilling system, using an keying mechanism and resilient shock isolation structure. The combination of a keying mechanism and a resilient shock isolation structure permit components to be mechanically engaged, substantially maintaining desired positioning at all times, permitting slight deviations, and restoring desired positioning after deviation. The resiliency also permits damping of vibrations/shocks.

In an embodiment, the shock isolated gamma probe includes a gamma sensor system or sensor package including a scintillator crystal, an optical coupling structure, a photo-multiplier tube (PMT), a PMT support structure, electronic controls, communications hardware and software, and a battery. The scintillator crystal is optically coupled to the PMT by an optical coupling pad. The PMT and the optical coupling pad are supported by the PMT holder, which holds the pad to the PMT. The outer body of the PMT holder may be the same diameter as the scintillator crystal to facilitate engagement with an outer support structure. That outer support structure may be a rigid or substantially rigid tubular support closely fitted to engage with the scintillator crystal and the PMT holder. That outer support structure may be formed as a cartridge, including a tube enclosing the sensor package radially and with the sensor package fixed thereto, such as by bonding or adhesives. The cartridge may also include a mechanical keying structure to resist rotation about the longitudinal axis. That mechanical keying structure may include a faceted key extending longitudinally from a closed end of the cartridge, where the facets may be oriented laterally and extend longitudinally. Those facets may also be converged by canting them inwardly at their distal ends. That mechanical keying structure includes a key having, e.g. a square, hexagonal, or octagonal profile for engagement with a profile-matched receiver. The cartridge may also include resilient elements on the ends thereof to protect the sensor package from axial shocks. The cartridge also includes a closure for an open end of the tubular support, such as a cap. The cap closes off the end of the cartridge, adjacent to the PMT end of the sensor package and may be used to compress the sensor package within the cartridge to prevent it from moving within. A resilient structure surrounds the cartridge to attenuate shocks, preferably in the longitudinal and lateral axes and for rotation about the longitudinal axis. That resilient structure may include a sleeve formed of a resilient material including a cylindrical body to radially engage with the tubular structure, a closed end to engage with the mechanical keying structure, and a compression gasket to engage with the cap. That cylindrical body may also include ribs, such as ones running longitudinally to provide further resilience and attenuation. The closed end may be joined with the cylindrical body, and can include a tip extending therefrom, the tip having an internal profile corresponding to the mechanical keying structure and an external profile corresponding to a profile-matched receiver for that mechanical keying structure. The shock isolated gamma probe also includes a chassis structure for supporting the sensor package and resilient structure, provide engagement to and within the MWD tool, and maintain axial position and rotational orientation. The chassis structure may be rigid or substantially rigid. The chassis structure includes mechanical and electronic connectors on each end for connection to, and orientation with, the MWD tool. The chassis also includes an enclosed tubular section, forming an outer shell, for close engagement to, and fixing of, the sensor package and resilient structure. One connector end of the chassis is mechanically connected to the tubular structure by a bulkhead supporting the connectors and the tubular structure and closing one end of the tubular structure. That sensor bulkhead may also support the profile-matched receiver structure for engagement with the mechanical key structure. The closed end of the resilient structure engages with the profile-matched receiver structure, and the mechanical keying structure engages resiliently with the with the profile-matched receiver structure through the resilient structure. That profile-matched receiver structure may be a key receiver with an internal square, hexagonal, or octagonal profile for engagement with a key. The sensor package may be compressed into the resilient structure and thence into the tubular support within the cartridge to prevent it from moving within. The chassis also includes an electronics section. The other connector end of the chassis is mechanically connected to an electronics enclosure by a bulkhead, the electronics enclosure supported by a second bulkhead on its far side. The second bulkhead is configured to connect to the tubular structure of the chassis section and close off the open end. That bulkhead also engages the cartridge through the resilient structure connectors to compress the cartridge into the tubular structure. The connection between the second bulkhead and the tubular structure of the chassis section can be by radially-oriented bolts or screws for retaining that axial compression.

In an embodiment, the shock isolated gamma probe includes a gamma sensor package encased by and fixed in a tubular cartridge. The cartridge includes a key to resist rotation about the longitudinal axis, the key being engaged with a key receiver fixed to a gamma probe chassis. The cartridge also includes a cap to compress the sensor package within the cartridge. The chassis includes an outer shell to protect and engage with the cartridge. Between the cartridge and chassis lies a resilient tubular sleeve. The sleeve creates resilient engagement between the key and key receiver in the longitudinal and lateral axes and about the longitudinal axis, and resilient engagement between the cartridge's tubular section and outer shell in the longitudinal and lateral axes and about the longitudinal axis, and permits only slight relative motion while restoring positioning and damping shocks. The chassis includes further compression bulkhead to compress and retain the cartridge within the outer shell and to the key receiver.

In an embodiment, a shock isolated gamma probe includes a sensor package, a substantially rigid cartridge enclosing the sensor package that includes a key, a resilient shock isolator sleeve enclosing the cartridge, and a substantially rigid chassis including a receiver for the key, where the key is engaged with the said key receiver, and the sleeve is resiliently interposed between the key and key receiver.

In an embodiment, a key and the key receiver each include a set of flat faces to facilitate engagement with one another and resist rotation. In a further embodiment, those faces extend parallel to the longitudinal axis are arranged in an angled pattern, e.g. a square, hexagon, or octagon. In a further embodiment, the key extends longitudinally from an end of the cartridge.

In an embodiment, a cartridge includes a closed end and a cap, and a sensor tube rigidly connecting the closed end and the cap. In a further embodiment, the closed end includes the key and the extends longitudinally from the closed end. In a further embodiment, the sensor tube includes a cylindrical cavity and the sensor package is fixed within the cavity such as by an adhesive or other bonding.

In an embodiment, the resilient shock isolator sleeve includes an inside profile conformed to the key and an outside profile conformed to the key receiver. In a further embodiment, those profiles are formed in a tip extending longitudinally from a closed end of the resilient shock isolator sleeve.

In an embodiment, the resilient shock isolator sleeve includes a resilient body and a compression gasket, where the body includes a cylindrical core around a cavity and a closed end, where the compression gasket closes the open end of the body. In a further embodiment, the closed end includes a tip into which key on a cartridge is seated, and the compression gasket is engaged with a cap on the cartridge.

In an embodiment, the shock isolated gamma probe chassis includes both a sensor chassis and an electronics chassis, where the sensor chassis includes a sensor bulkhead at one end that includes the key receiver, and where the electronics chassis compresses the sleeve and sensor cartridge against said sensor bulkhead. In a further embodiment, the sensor chassis includes an outer shell for receiving and engaging with the sleeve and sensor cartridge, and the electronics chassis includes both a middle bulkhead and an electronics bulkhead, where the middle bulkhead compresses the sleeve and sensor cartridge inside the outer shell.

In an embodiment, a shock isolated gamma probe includes a sensor package, a substantially rigid cartridge enclosing the sensor package, a shock isolator sleeve enclosing the cartridge, and a substantially rigid sensor chassis, where the cartridge is mechanically keyed to the sensor chassis to restrict rotation about a longitudinal axis, and the sleeve resiliently absorbs shocks between cartridge and the sensor chassis.

In an embodiment, a cartridge includes a longitudinally-extending key and the sensor chassis includes a key receiver or pocket engaged with the key. In a further embodiment, the sleeve also includes a tip, and the shock isolated gamma probe also includes an electronics chassis compressing the key into the tip and the tip into the key receiver.

In an embodiment, the resilient shock isolator sleeve includes a cylindrical core around a cavity, an open end, and a closed end having a tip extending therefrom. In a further embodiment, the sleeve also includes a longitudinally extending tip having an inside profile conformed to the key and formed into said tip.

In an embodiment, a cartridge includes a closed end, a cap, a sensor tube connecting the closed end and the cap, where the closed end includes a longitudinally-extending key. In embodiment, a cartridge includes a longitudinally-extending key, and the sleeve includes a longitudinally extending tip, where the key is seated in the tip.

BRIEF DESCRIPTION OF THE DRAWINGS

FIG. 2B is a cross-sectional view of the device of FIG. 2A along section A-A and FIG. 2C is an enlarged view of one end of FIG. 2B.

FIG. 3A is a perspective view of component of a shock isolated gamma probe.

FIG. 3B is a cross-sectional view of the component of FIG. 3A along section C-C.

FIG. 3C is a perspective, exploded view of the component of FIG. 3A.

FIG. 3D is a perspective, exploded view of a portion of the component of FIG. 3C.

FIG. 4A is a side view of component of a shock isolated gamma probe.

FIG. 4B is a cross-sectional view of the component of FIG. 4A along section D-D.

FIG. 4C is a perspective cutaway view of the component of FIG. 4A.

FIG. 5A is a perspective view of the assembly of two components of a shock isolated gamma probe.

FIG. 5B is a perspective view of the assembly of the components of FIG. 5A into third component of a shock isolated gamma probe in a partial cutaway view.

DETAILED DESCRIPTION

Figure 1:
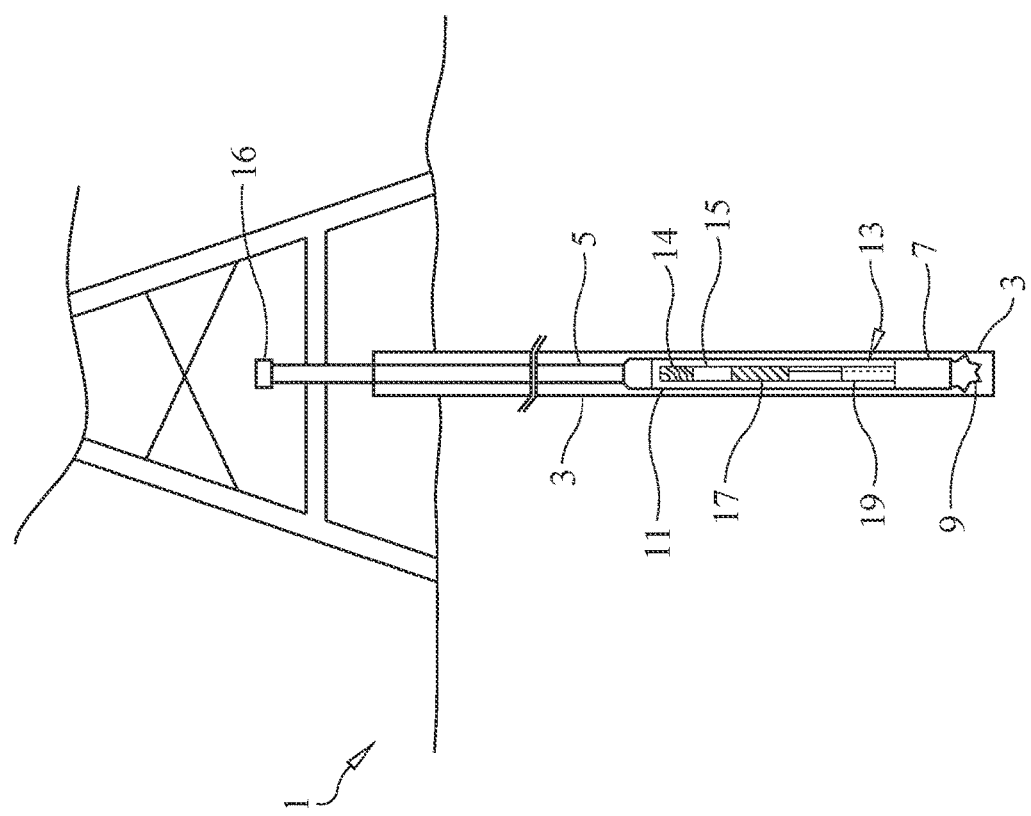
FIG. 1 is a representative view and partial cutaway of parts of the surface and downhole portions of a drilling rig.

Referring now to the drawings and specifically to FIG. 1, there is generally shown therein a simplified sketch of the drilling system 1 used in the rotary drilling of boreholes. A drill string 5 used to drill bore 3 is made up of multiple sections of drill pipe that are secured to the surface and extend into bore 3 and include mud motor 7, and drill bit 9 at the bottom thereof. The entire drill string 5 is rotated while drill string 5 is lowered into the bore and controlled axial compressive loads are applied. The bottom of drill string 5 is attached to multiple drilling collars 11, which are used to stiffen the bottom of drill string 5 and add localized weight to aid in the drilling process. A measurement while drilling (MWD) tool assembly 13 is generally depicted attached to the bottom of drill collars 11 and drill bit 9 and mud motor 7 are attached to the bottom of MWD tool assembly 13. MWD tool assembly 13 communicates with MWD signal processor 16 on the surface.

The drilling fluid or "mud" is forced to flow into the top of drill string 5. The fluid flows through drill string 5, through drill collars 11, through MWD tool assembly 13, through mud motor 7 and drill bit 9. The drilling fluid then returns to the surface by traveling through the annular space between the outer diameter of drill string 5 and bore 3. MWD tool assembly 13 includes within its inner diameter main pulser 19, servo pulser 17, gamma probe 15, and instrument module 14, which may include a battery section. Main pulser 19 is hydraulically connected to servo pulser 17 at one end to create a path for drilling fluid between those components. The other end of main pulser 19 is in contact with the internal drilling fluid column within the inner diameter of MWD tool assembly 13. Gamma probe 15 and instrument module 14 are attached to the far end of servo pulser 17.

Figure 2A:
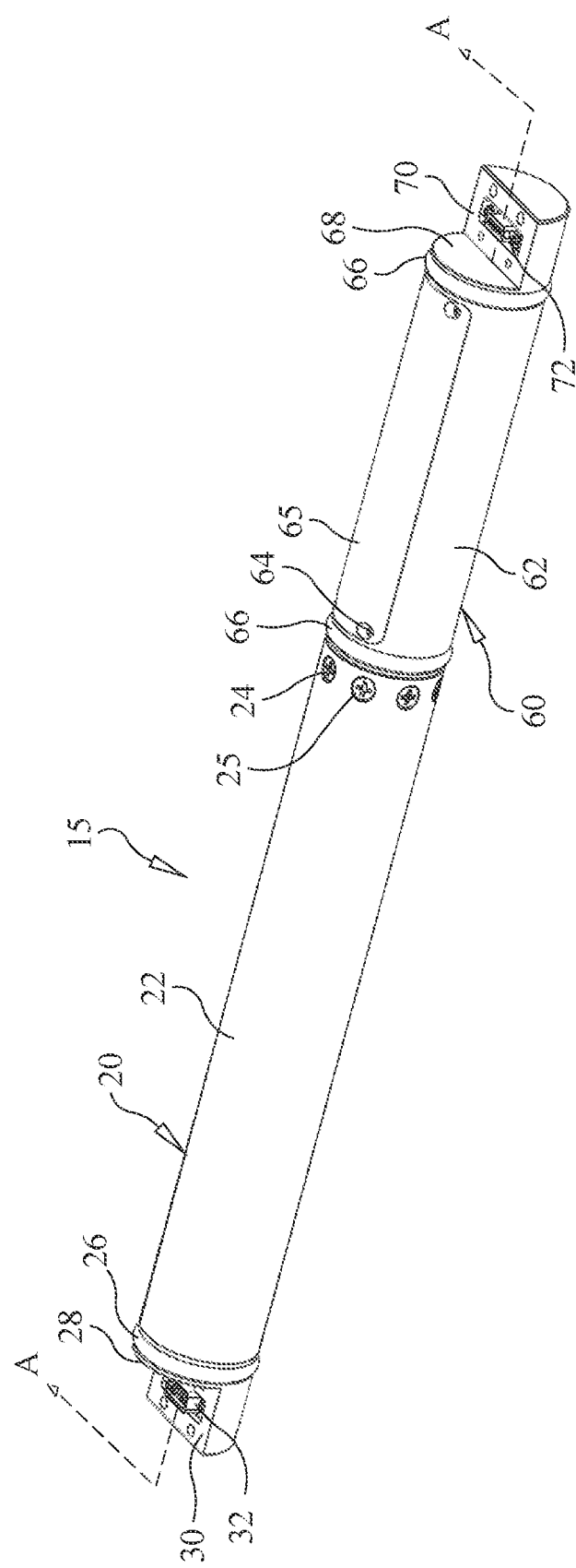
FIG. 2A is a perspective view of an embodiment of a shock isolated gamma probe.
Figure 2D:
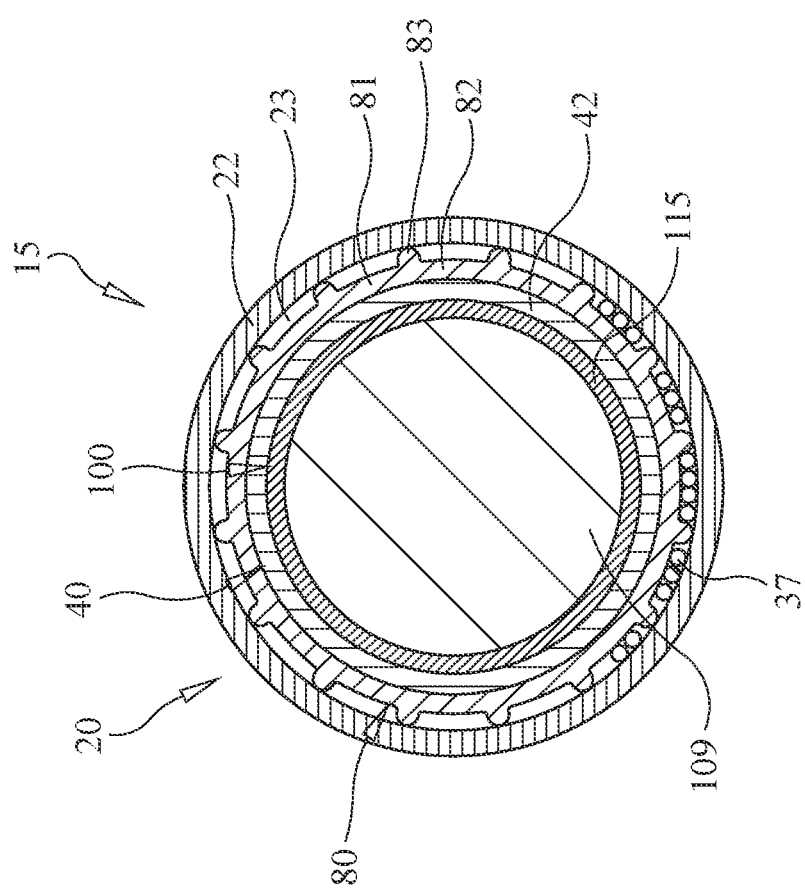
FIG. 2D is a cross-sectional view of the device of FIG. 2A along section B-B shown in FIG. 2B.

Referring now to FIGS. 2A, 2B, 2D, 5A, 5B, & 5C, an embodiment of gamma probe 15 includes sensor chassis 20, sensor cartridge 40, sensor package 100, and electronics chassis 60. As shown in FIG. 2D, sensor chassis 20, sensor cartridge 40, and sensor package 100 are arranged concentrically moving inwardly.

With specific references now to FIGS. 2A, 2B, 2C, 2D, & 5A, in an embodiment, sensor chassis 20 includes sensor bulkhead 28, circled by gasket 26 for installation within MWD tool assembly 13, near one longitudinal end. One side of sensor bulkhead 28 supports mechanical interconnect 30 and plug 32 for connecting to other components in MWD tool assembly 13. On the opposite side, sensor bulkhead 28 includes key receiver 29 for engagement with key 48 of sensor cartridge 40. Key receiver 29 includes four flat faces 35 arranged in a square formation, which extend longitudinally and are oriented laterally. Outer shell 22 is tubular and connected to sensor bulkhead 28, closing it at that end. Outer shell 22 also defines internal cavity 23 and has open end 34 opposite of sensor bulkhead 28. Near open end 34, outer shell 22 includes radially-spaced holes 25 configured for bolts 24, for connection to electronics chassis 60 via threaded holes 69 in middle bulkhead 63. Plug 32 is attached to wire assembly 31 which passed through wireway 37 in sensor bulkhead 28 into cavity 38 and then into cavity 23, leading to electronics chassis 60. Interconnect 30, sensor bulkhead 28, and outer shell 22 are all rigid or at least substantially rigid as they are load-bearing in that they support the mass of gamma probe 15 and must resist the shocks and loads applied to MWD tool assembly during operation and/or or apply/accept compression forces.

With specific references now to FIGS. 2C, 2D, 3A, 3B, 3C, 5A, 5B, & 5C, in an embodiment, sensor cartridge 40 includes body 41 and cap 56. Body 41 includes sensor tube 42, defining cylindrical cavity 44 within, and having closed end 46 adjacent to sensor bulkhead 28 and open end 54 opposite closed end 46. Closed end 46 includes face 47 having key 48 extending longitudinally therefrom. Key 48 includes four flat faces 49 arranged in a square formation, which extend longitudinally and are oriented laterally. Key 48 defines hole 50 longitudinally therethrough connecting to cylindrical cavity 44. At open end 54, threaded recess 52 is provided for connection to cap 56. Cap 56 connects for threading advancement with sensor tube 42 via threaded recess 52, and includes data passageway 55 from cylindrical cavity 44 to electronics chassis 60. Data passageway 55 also connects grounding lug 58, which is retained to cap 56 using screw 57, to connect ground to electronics chassis 60. Key 48 is dimensioned smaller than key receiver 29 to permit shock isolator sleeve 80 to be interposed between for close and resilient engagement of sensor cartridge 40 and sensor chassis 20. Likewise, sensor tube 42 is dimensioned smaller than outer shell 22 to permit shock isolator sleeve 80 to be interposed between for close and resilient engagement of sensor cartridge 40 and sensor chassis 20. Closed end 46, sensor tube 42, and cap 56 are all rigid or at least substantially rigid as they are load-bearing in that they support the mass of gamma probe 15 and must resist the shocks and loads applied to MWD tool assembly during operation and/or or apply/accept compression forces.

With specific references now to FIGS. 2D, 3B, 3C, & 3D, in an embodiment, sensor package 100 includes scintillation crystal 104, PMT 109, PMT holder 115, optical coupling pad 122, and compression gaskets 102. Scintillation crystal 104 is substantially or completely cylindrical and includes far end 105 near closed end 46 of sensor cartridge 40, PMT end 106, and outer surface 107. Face 123 of optical coupling pad 122 is held flush and firmly against PMT end 106 and the other face 123 of optical coupling pad 122 is held flush and firmly against input end 110 of PMT 109. PMT also includes output end 111 with wires 112 and outer surface 113. Optical coupling pad is supported by pad bracket 116 of PMT holder 115 at pad end 119. PMT holder 115 encases PMT 109 and provides a window for optical coupling pad 22 at pad end 119 and for wires 112 at open end 118, and further includes outer surface 120. Sensor package 100 and its components are dimensioned almost the same as cylindrical cavity 44 of sensor tube 42 for close mechanical engagement and bonding. Bonding layer 53 connects outer surface 107 of scintillation crystal 104 and outer surface 120 of PMT holder 115 within cavity 44 of sensor tube 42 to prevent relative rotation therebetween.

With specific references now to FIGS. 2C, 2D, 4A, 4B, 4C, 5B & 5A, in an embodiment, shock isolator sleeve 80 includes resilient body 81 and compression gasket 90. Resilient body 81 includes cylindrical core 82, open end 84, and closed end 85. Cylindrical core 82 has longitudinal ribs 83 on its outside and defines cavity 91 on its inside. Closed end 85 includes longitudinally-extending tip 87. Tip 87 includes four sides 88 arranged in a square formation, which extend longitudinally and are oriented laterally. Tip 87 has an outside profile 86 and inside profile 89 formed therein, which conform, respectively, to an inner configuration of 35 of key receiver 29, and to an outer configuration of key faces 49 of key 48. Compression gasket 90 is sized to provide resilient engagement between cap 56 and middle bulkhead 63 of electronics chassis 60. Cavity 91 of shock isolator sleeve 80 is dimensioned almost the same as sensor tube 42, and ribs 83 on cylindrical core 82 are dimensioned so that its largest diameter is almost the same as or slightly larger than cavity 23 of outer shell 22 for resilient engagement therebetween. Likewise, tip 87 is dimensioned to conform internally to key 48 and externally to key receiver 29. The thickness (or thicknesses) of the resilient material forming cylindrical core 82 and ribs 83 and of tip 97 are selected to provide close engagement with the inner components (e.g. sensor tube 42 & key 48) and outer components (e.g. cavity 23 & key receiver 29). This also implicates the relative dimensioning of the sensor tube 42, cavity 23, key 48, key receiver 29, to permit spacing sufficient for the desirable thickness for resilient engagement.

Figure 5C:
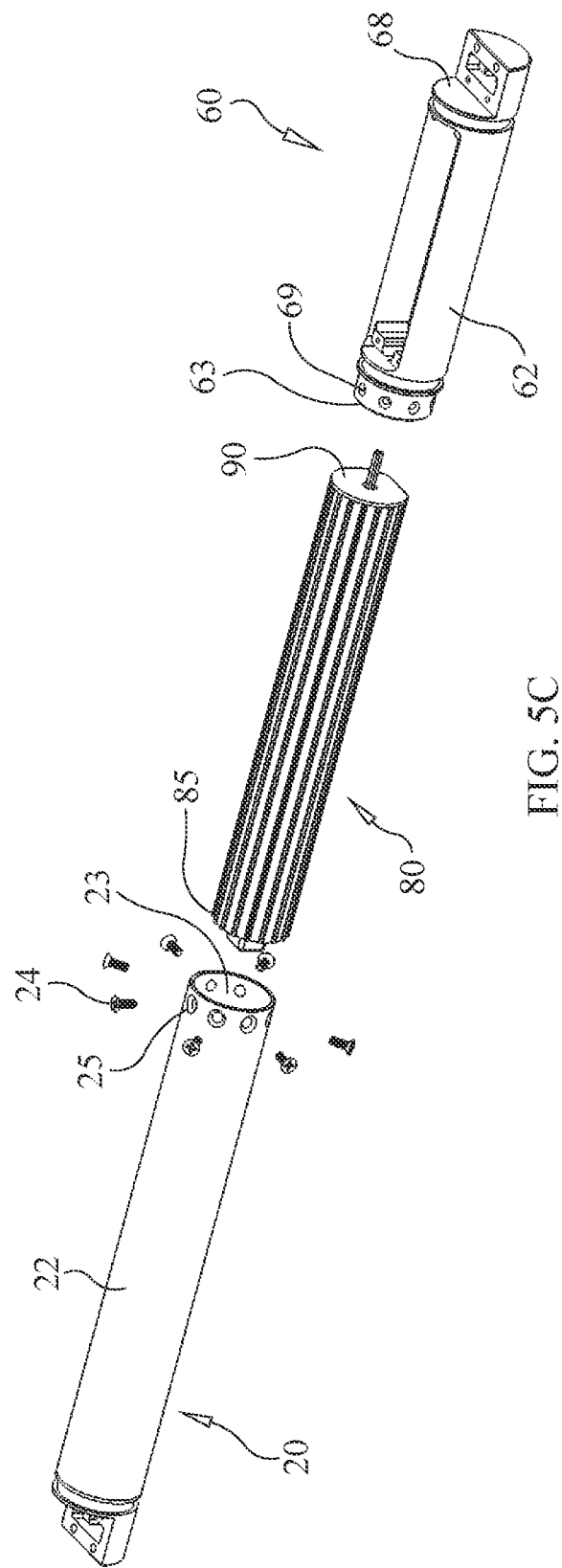
FIG. 5C is a perspective view of the assembly of the components of FIG. 5A into third component of a shock isolated gamma probe and with a fourth component of a shock isolated gamma probe.

With specific references now to FIGS. 2A, 2B, & 5C, in an embodiment, electronics chassis 60 includes body 62 attached to middle bulkhead 63 at one end and electronics bulkhead 68 on the other. Body 62 defines electronics chamber 67 holding electronics 61. Body 62 also includes an access cover 65 closing electronics chamber 67, which is held to body 62 by screws 64. Middle bulkhead 63 includes passageway 76, for wires 112 of PMT 109, and radially-spaced threaded holes 69, for bolts 24 to attach electronics chassis 60 to sensor chassis 20. Electronics bulkhead 68 supports mechanical interconnect 70 and plug 72 for connecting to other components in MWD tool assembly 13. Plug 72 is attached to wire assembly 71 which passes through wireway 77 in electronics bulkhead 68 into electronics chamber 67, and from there into cavity 78 of middle bulkhead 63 via wireway 77, and then into cavity 23, connecting to plug 32 on interconnect 30 (as described for sensor chassis 20). Electronics bulkhead 68 and middle bulkhead 63 are each circled by a gasket 66 for installation within MWD tool assembly 13. Interconnect 70, middle bulkhead 63, electronics bulkhead 68, and body 62, are all rigid or at least substantially rigid as they are load-bearing in that they support the mass of gamma probe 15 and must resist the shocks and loads applied to MWD tool assembly during operation and/or or apply/accept compression forces.

With specific references now to FIGS. 2A, 2B, 2C, 2D, 3A, 3B, 3C 5A, 5B, & 5C, in an embodiment, gamma probe 15 is assembled in the following manner.

Compression gasket 102 is situated on far end 105 of scintillation crystal 104 and bonding layer 53 is applied to outer surface 113 of scintillation crystal 104. Compression gasket 102 and scintillation crystal 104 are inserted into cylindrical cavity 44 of sensor tube 42 until compression gasket 102 seats on the inside of face 47 of body 41. Bonding layer 53 then bonds outer surface 113 inside cylindrical cavity 44. Optical coupling pad 122 is fixed in pad bracket 116 of PMT holder 115 with face 123 seated fully flush on input end 110 of PMT 109. PMT 109 is fixed within body 117 of PMT holder 115 with wires 112 extending out of open end 118. Bonding layer 53 is applied to outer surface 120 of PMT holder 115 and PMT holder 115 is inserted pad end 119 first, until face 123 of optical coupling pad 122 is seated fully flush on PMT end 106 of scintillation crystal 104. Bonding layer 53 then bonds outer surface 120 inside cylindrical cavity 44. An additional compression gasket 102 is situated on open end 118 of PMT holder 115. Cap 56 is threaded into at open end 54 of sensor tube 42 via threaded recess 52. Advancing cap 56 compresses compression gaskets 102 between cap 56 and face 47, and fully seats optical coupling pad 122 between scintillation crystal 104 and PMT 109.

Sensor cartridge 40 (containing sensor package 100) is inserted, closed end 46 first, into open end 84 of shock isolator sleeve 80. Sensor cartridge 40 is advanced into cavity 91, with sensor tube 42 flush to cylindrical core 82, until key 48 seats in tip 87 of closed end 85. Key 48 is oriented so that key faces 49 lie flush to sides 88 in tip 87. Compression gasket 90 is situated over cap 56 with wires 112 extending therethrough.

Shock isolator sleeve 80 (containing sensor cartridge 40 and sensor package 100) is inserted, closed end 85 first, into open end 34 of outer shell 22 of sensor chassis 20. Shock isolator sleeve 80 is advanced into cavity 23, with ribs 83 flush to outer shell 22 until tip 87 seats in key receiver 29 on sensor bulkhead 28. With shock isolator sleeve 80 inserted, holes 25 of outer shell 22 are exposed from the inside. Wire assembly 31 is situated in cavity 23 adjacent to outer shell 22. Ribs 83 are advanced such that wire assembly 31, or individual wires thereof, lie in voids between adjacent ribs 83 and cylindrical core 82 and outer shell 22. Tip 87 and key 48 are oriented so that sides 88 lie flush to faces 35 in key receiver 29. This permits resilient engagement between key 48 and key receiver 29, and thus sensor cartridge 40 and sensor chassis 20. Alternatively, compression gasket 90 maybe situated over cap 56 with wires 112 extending therethrough after shock isolator sleeve is inserted.

Middle bulkhead 63 of electronics chassis 60 is advanced into void 23 of sensor chassis 20 until threaded holes 69 align with holes 25 of outer shell 22. Bolts 24 are fixed in threaded holes 69, joining electronics chassis 60 to sensor chassis 20. Cover 65 is installed using screws 64 to cover electronics 61 in electronics chamber 67.

Gamma probe 15 is connected to MWD tool assembly 13 using interconnect 30, interconnect 70, plug 32, and plug 72.

The invention claimed is:

1. A shock isolated gamma probe configured for incorporation into a drilling system in an environment experiencing shocks along a longitudinal axis and lateral axis and torsional shocks forces about the longitudinal axis, the probe comprising:
   a sensor package;
   a substantially rigid cartridge;
      said cartridge comprising a key; and
      said cartridge enclosing the sensor package;
   a resilient shock isolator sleeve;
      said sleeve enclosing the cartridge; and
   a substantially rigid chassis;
      said chassis comprising a key receiver;
   said key being engaged with said key receiver, wherein the sleeve is resiliently interposed between the key and key receiver.

2. The shock isolated gamma probe of claim 1,
   said key comprising a plurality of flat key faces; and
   said key receiver comprising a plurality of flat faces.

3. The shock isolated gamma probe of claim 2,
   the plurality of flat key faces extending parallel to the longitudinal axis; and
   the plurality of flat faces extending parallel to the longitudinal axis.

4. The shock isolated gamma probe of claim 2, said sleeve comprising:
   an inside profile conformed to the key; and
   an outside profile conformed to the key receiver.

5. The shock isolated gamma probe of claim 1, said sleeve comprising:
   a longitudinally extending tip;
   an inside profile conformed to the key;
   an outside profile conformed to the key receiver; and
   said inside profile and outside profile formed into said tip.

6. The shock isolated gamma probe of claim 1, said sleeve comprising;
   a resilient body, comprising:
      a cylindrical core defining a cavity;
      a closed end having a tip extending therefrom; and
      an open end of the body; and
   a compression gasket for closing the open end of the body.

7. The shock isolated gamma probe of claim 1, said cartridge comprising;
   a closed end;
   a cap; and
   a sensor tube connecting the closed end and the cap.

8. The shock isolated gamma probe of claim 7:
   the closed end comprising the key; and
   said sensor package comprising connectors extending longitudinally therefrom;
   said cap comprising a passageway for said connectors.

9. The shock isolated gamma probe of claim 7,
   the key defining a hole through the closed end.

10. The shock isolated gamma probe of claim 1,
    said cartridge comprising:
       an open end;
       a closed end; and
       a cap; and
    the closed end having the key extending therefrom; and
    the cap closing the open end.

11. The shock isolated gamma probe of claim 10,
    the sleeve comprising a resilient body, the resilient body comprising:
       a cylindrical core defining a cavity;
       a closed end of the sleeve having a tip extending therefrom.

12. The shock isolated gamma probe of claim 11,
    the sleeve further comprising a compression gasket;
    said key seated in said tip; and
    said compression gasket against said cap.

13. The shock isolated gamma probe of claim 1, the sensor package comprising:
    a scintillator crystal;
    a photo-multiplier tube;
    a photo-multiplier tube holder supporting said photo-multiplier tube; and
    compression gaskets.

14. The shock isolated gamma probe of claim 1:
    the cartridge further comprising a sensor tube defining a cavity therein;
    the sensor package bonded to said sensor tube inside said cavity.

15. The shock isolated gamma probe of claim 1:
    said sleeve comprising an inside profile conformed to the key and an outside profile conformed to the key receiver;
    the cartridge further comprising a closed end, a cap, and sensor tube connecting the closed end and the cap; and
    said key comprising a plurality of flat key faces extending parallel to the longitudinal axis.

16. The shock isolated gamma probe of claim 1, said chassis further comprising:
    a sensor chassis; and
    an electronics chassis;
    said sensor chassis comprising a sensor bulkhead;
       said sensor bulkhead comprising the key receiver; and said electronics chassis compressing said sleeve and said sensor cartridge against said sensor bulkhead.

17. The shock isolated gamma probe of claim 16:
said sensor chassis further comprising an outer shell;
said outer shell configured to receive said sleeve and said sensor cartridge;
the electronics chassis comprising a middle bulkhead, and an electronics bulkhead;
said middle bulkhead compressing said sleeve and said sensor cartridge inside said outer shell.

18. The shock isolated gamma probe of claim 1,
the cartridge further comprising a face;
wherein the key extends longitudinally from the face.

19. The shock isolated gamma probe of claim 1:
said sleeve further comprising a longitudinally extending tip; and
the key inserted into said sleeve to seat into said tip.

20. A shock isolated gamma probe comprising:
a sensor package;
a substantially rigid cartridge enclosing the sensor package;
a shock isolator sleeve enclosing the cartridge;
a substantially rigid sensor chassis;
the cartridge mechanically keyed to the sensor chassis to restrict rotation about a longitudinal axis; and
the sleeve resiliently absorbing shocks between the cartridge and the sensor chassis.

21. The shock isolated gamma probe of claim 20,
the cartridge comprising a longitudinally-extending key.

22. The shock isolated gamma probe of claim 21,
the sensor chassis comprising a key receiver engaged with the key.

23. The shock isolated gamma probe of claim 21, said sleeve comprising:
a longitudinally extending tip; and
an inside profile conformed to the key and formed into said tip.

24. The shock isolated gamma probe of claim 20, said sleeve comprising:
a cylindrical core defining a cavity;
a closed end having a tip extending therefrom; and
an open end of the body.

25. The shock isolated gamma probe of claim 20, said cartridge comprising:
a closed end;
a cap; and
a sensor tube connecting the closed end and the cap;
the closed end comprising a longitudinally-extending key.

26. The shock isolated gamma probe of claim 20,
the cartridge comprising a longitudinally-extending key;
said sleeve comprising a longitudinally extending tip; and
said key seated in said tip.

27. The shock isolated gamma probe of claim 26,
further comprising an electronics chassis;
the sensor chassis comprising a key receiver; and
said electronics chassis compressing said key into said tip and said tip into said key receiver.

28. The shock isolated gamma probe of claim 20,
the cartridge further comprising a face and a key extending longitudinally from the face.

29. The shock isolated gamma probe of claim 20,
the cartridge comprising a longitudinally-extending key;
said sleeve further comprising a longitudinally extending tip; and
the key inserted into said sleeve to seat into said tip.

\* \* \* \* \*